United States Patent [19]

Ryser et al.

[11] Patent Number: 5,005,003

[45] Date of Patent: Apr. 2, 1991

[54] METHOD OF DETECTING FIRE IN AN EARLY STAGE

[75] Inventors: Peter Ryser, Stafa; Sigfrid Strassler, Baden-Dattwil, both of Switzerland

[73] Assignee: Cerberus AG, Switzerland

[21] Appl. No.: 330,187

[22] Filed: Mar. 29, 1989

[30] Foreign Application Priority Data

Mar. 30, 1988 [CH] Switzerland .......................... 1193/88
Dec. 23, 1988 [CH] Switzerland .......................... 4760/88

[51] Int. Cl.$^5$ .............................................. G08B 17/00
[52] U.S. Cl. ...................................... 340/587; 340/693
[58] Field of Search ......... 340/587, 522, 578, 628–630, 340/693

[56] References Cited

U.S. PATENT DOCUMENTS

| | | | |
|---|---|---|---|
| 3,742,474 | 6/1973 | Muller | 340/578 |
| 3,908,957 | 9/1975 | Schütt | 340/629 X |
| 3,909,813 | 9/1975 | Scheidweiler et al. | 340/629 X |
| 3,916,209 | 10/1975 | Steele et al. | 340/630 X |
| 3,922,656 | 11/1975 | Horvath et al. | 340/630 X |
| 3,994,603 | 11/1976 | Paschedag | 340/630 X |
| 4,065,758 | 12/1977 | Barbier et al. | 340/578 |
| 4,134,111 | 1/1979 | Nudds | 340/629 |
| 4,300,133 | 11/1981 | Solomon | 340/630 |
| 4,617,560 | 10/1986 | Gutmann | 340/628 |
| 4,691,196 | 9/1987 | Kern et al. | 340/578 |
| 4,746,910 | 5/1988 | Pfister | 340/567 |

FOREIGN PATENT DOCUMENTS

| | | |
|---|---|---|
| 3419802 | 11/1985 | Fed. Rep. of Germany . |
| 8715667.9 | 3/1988 | Fed. Rep. of Germany . |
| 2441227 | 6/1980 | France . |
| 572252 | 1/1976 | Switzerland . |
| 663678A | 1/1984 | Switzerland . |
| 1485790 | 9/1977 | United Kingdom . |
| 1486535 | 9/1977 | United Kingdom . |

*Primary Examiner*—Glen R. Swann, III
*Assistant Examiner*—Thomas J. Mullen, Jr.
*Attorney, Agent, or Firm*—Brumbaugh, Graves, Donohue & Raymond

[57] ABSTRACT

To improve probability of detection in the early stages of fires, a fire alarm (1) with a temperature sensor (3) is proposed, having a structural member (12) that causes the sensor (3) to react only to temperature changes in the ambient air, and which change with a frequency of from 0.1 to 20 Hz. The fire alarm (1) becomes particularly insensitive to errors when there is a second fire sensor (7) that reacts to fire aerosol, there being a threshold value circuit (9) that lowers the threshold value for the fire aerosol sensor (7) when the temperature sensor (3) exceeds a preset threshold value.

25 Claims, 4 Drawing Sheets

METHOD OF DETECTING FIRE IN AN EARLY STAGE

BACKGROUND OF THE INVENTION

The invention relates to a method and apparatus for early fire detection.

Automatic fire alarms are used for the timely detecting of fires, and thus for the protection of human life and property. They have become an integral part of protection concepts and safety systems, which are no longer designed without them. In particular, inventions in the domain of smoke detection made effective early warning possible. The installation of millions of automatic fire alarms all over the world proves the success of the products that have originated in these inventions. The extreme sensitivity of modern smoke detectors facilitates alarm at an early stage so that in most cases appropriate and timely measures can be introduced. However, high sensitivity to smoke conditions has gone hand in hand with an increase in the probability of erroneous triggering (false alarm) by deceptive phenomena that simulate fire. As a consequence of the increasing numbers of fire alarm systems, the increasing numbers of false alarms has created a problem that has become a steadily growing threat to the effectiveness and acceptance of this technology.

The manufacturers of automatic fire alarm systems have recognized this danger, and for years have been endeavoring to meet this threat through improvement on known detection principles and through the use of improved signal processing. The goal of all improvements is to reduce the number of false alarms without, at the same time, giving up the advantage of early warning, i.e., reducing the sensitivity.

One possibility for reducing false alarms consists of examining multiple fire related criteria for the triggering of an alarm, i.e., "multi-criteria alarms." Such an alarm will be triggered only if multiple detected fire related criteria simultaneously exceed preset values. In this way, the deceptive characteristic quantities that affect some of the sensors used are eliminated. One disadvantage of these methods is the possibility that genuine fires may not be detected because one of the sensors used does not produce a signal. This can happen when one of the sensors is defective or when one of the sensors is not giving off any signal because the fire characteristic quantity to which it reacts is not present.

Other methods endeavor, through the use of special algorithms, to interpret the sensor signals in such manner that only fire-specific processes lead to an alarm. Fire specific data are stored as reference values and are continuously compared with the sensor data. Through the use of correlation methods, the probability of whether a true fire or an error exists can be computed for the sensor signals. Although considerable progress was achieved with both methods, the false-alarm problem cannot by any means be considered solved. Another objection is that the results to date were achieved only with the use of considerable electronic complexity so that the cost/benefit ratio was not very beneficial. However, there is no doubt that a fire sensor which because of its specific capabilities reacts only to genuine characteristic fire parameters and not to false criteria (error quantities), represents the best solution to be sought.

When we study the characteristic criteria that occur when there is a fire, we note that in addition to the occurrence of combustion products, such as gases or aerosols, an increase in temperature can always be recorded. This means that there is no property-damaging fire without a heat source, whether as initiating factor or through the independent action of the fire itself. Sooner or later, every fire leads to an increase in ambient temperature. For this reason, the oldest and still most frequently used fire alarms are temperature detectors. However, in these alarms, as a rule, the alarm is triggered only when the ambient temperature climbs above 60° C. By then, the fire has already spread considerably, and therefore we cannot characterize this type of alarm a genuine early warning type.

Efforts to increase the sensitivity of heat alarms led to the development of heat differential alarms, which sense only the speed with which the temperature rises. But even with this technology, the early stage of a fire, which as a rule is a smoldering fire, cannot be satisfactorily detected. On the other hand, it would not be appropriate further to lower the detection threshold of heat alarms, because, as research has shown, this would lead to frequent false alarms.

Another detection method consists of interpreting heat radiation from an active flame as a fire criterion. In the case of a naked fire, which has no preceding smoldering phase, such as for example all liquid fires, such alarms are the fastest detectors. To render them insensitive to error quantities, the always-present flickering of a flame is used. This radiation fluctuation has fire-specific qualities and can be used for the differentiation of error quantities. Through the use of appropriate filters, it has become possible to exclude the effects of outside sources of light.

However, these alarms also have the aforementioned disadvantage of being unable to detect the smoldering phase of a fire. In addition, flame alarms must be in direct optical contact with the source of light; that is, they must "see" the flame. It has already been indicated that the phenomenon or characteristic fire quantity "temperature" is a feature of each and every fire. An increase in the temperature of the fire material expresses itself on the one hand in the emission of heat radiation; on the other, it leads to an increase in the air temperature around the area of the fire. The consequence is a heat convection current that on the one hand conveys the combustion products to the ceiling and on the other hand leads to temperature fluctuations in the vicinity of that point. If this effect is exploited for early fire detection, however, false alarms caused by error quantities must be expected, since heat sources not ascribable to a fire (heaters, gas burners, etc.) can lead to temperature fluctuations in the ceiling area.

BRIEF SUMMARY OF THE INVENTION

Thorough and extensive measurements of temperature fluctuations caused in the ceiling area by fire indicate initially, as a qualitative result, that the time variation of temperature changes has fire-specific qualities. This phenomenon that can be used to differentiate genuine fires from error quantities. By analysis of the frequency spectrum of output signals of temperature sensors, further quantitative evidence was found to prove that the predominant share of the fluctuations occurred in the range of 0.1 Hz to 20 Hz. When the output signal is put through a filter with an appropriate amplitude and frequency characteristic, then parasitic, error producing quantities can be effectively eliminated without negative influence on the probability of detection of genuine fires. A requirement for this is, of course, the availability of temperature sensors having the capacity to detect rapid temperature changes with minimal thermal inertia. It must also be insured that in fact only the change in air temperature, not the heat radiation, is measured.

The goal of the present invention is to create a new method and apparatus for early detection of fires, said method and apparatus avoiding the disadvantages of the prior art. In particular this method and apparatus offers increased security against false alarms in the detection of fires in the initial phase, such as a smoldering fire.

The objective of the present invention is further to create a fire alarm for use with the method according to the invention, which said alarm offers improved security against false alarms.

Yet another objective of the present invention is to further diminish the false-alarm sensitivity of fire alarms that react very sensitively to more than one of the fire characteristic quantities (phenomena) occurring when a fire breaks out, one criterion being the increase in temperature in the area around a fire.

Another goal of the present invention is further to create a fire alarm that reacts with minimal time delay to the temperature fluctuations created by open fires, and which is relatively insensitive to direct heat radiation.

Through interpretation of fire-specific qualities of temperature changes, fire-simulating error quantities are to a great extent eliminated. According to an embodiment of the invention, a second fire criterion is processed. It is particularly preferred if a second sensor is provided in the fire alarm, which said second sensor reacts to another fire criterion, preferably a fire aerosol; the second sensor is in particular an optical smoke sensor or an ionization type smoke sensor.

According to a first embodiment of the invention, the fire alarm according to the invention is coupled to a specially shaped mechanical structure that causes the temperature fluctuations in the air current and ascribable to a fire to be conveyed undistorted to the sensor. This structure is constructed preferably in such manner that the air inside the fire alarm flows laminarly to the temperature sensor, so that the temperature fluctuations are not disrupted. The laminar flow is achieved by providing ribs, ridges or in the alternative, bars, in the passage leading to the temperature sensor. The presence of these ribs promotes laminar air flow to the temperature sensor chamber. The ribs terminate just outside the sensor chamber, and this discontinuity creates some air turbulence that promotes good heat transfer to the temperature sensor.

According to a second embodiment of the invention, said mechanical structure is constructed in such manner that the air inside the fire alarm is conveyed to the temperature sensor as quickly as possible, so that it is not cooled, and also so that a good heat exchange occurs on the heat sensor surface.

According to yet another embodiment of the invention, said mechanical structure is designed in such manner that together with the housing of the fire alarm they form an air funnel open to the outside of the housing. Said funnel narrows into the measuring chamber position in the axis of the fire alarm. Preferably, ribs running radially are positioned on the inside of the air inlet opening, so that said ribs conduct the inflowing air to the measuring chamber. In particular, the funnel has a funnel mouth with a relatively large inlet cross-section, and a funnel throat with an outlet cross-section that is small compared to the cross-section of the inlet.

According to yet another embodiment of the invention, said mechanical structure is designed in such a manner that the surface of the temperature sensor forms one wall of the measuring chamber, and that the open space of the measuring chamber is not larger than the volume of the temperature sensor. Said mechanical structure contains ridges positioned preferably at the point at which the air enters the measuring chamber, which causes the air to swirl. Bars or strips have proven particularly suitable for swirling of the air, but care must be taken that the air flow is distorted before the air current reaches the temperature sensor to assure good heat transfer to the sensor.

According to yet another embodiment of the fire alarm according to the invention, the funnel is designed for cylindrical symmetry, in such a manner that its longitudinal section corresponds to the longitudinal section of a Venturi tube. This also promotes better heat transfer to the temperature sensor.

According to another embodiment of the fire alarm according to the invention, the fire alarm has circuit elements that are configured in such manner that they can perform logical operations with the signals from the fire aerosol sensor and those of the temperature sensor. Preferably, the circuit elements are configured so that the logical connection is achieved by the creation of a signal at the output of the output circuit when both sensors simultaneously create specific signals. It is particularly preferable if in the processing channel for the temperature sensor and in the processing channel for the aerosol sensor circuit elements to provide a threshold comparing circuit having the ability to compare the output from the sensor to a programmable or fixed threshold value, with additional circuit elements being provided and arranged in such manner that the threshold value in the processing channel for the aerosol sensor is lowered if the output signal in the processing channel for the temperature sensor exceeds a predetermined threshold value.

BRIEF DESCRIPTION OF THE DRAWINGS

The invention is described in greater detail by means of the embodiments illustrated in the drawings.

Figure 1:
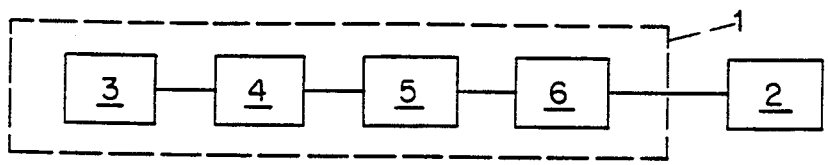
FIG. 1 shows the block diagram of a fire alarm according to the invention.

The following is a list of reference items in the drawings to facilitate their comprehension.

| | |
|---|---|
| Fire alarm | 1 |
| Central control unit | 2 |
| Temperature sensor | 3 |
| Pass-band filter | 4 |
| Root-Mean-Square-DC converter = RMS-DC Converter | 5 |
| Output circuit | 6 |
| Scattered-light smoke sensor | 7 |
| Evaluation circuit | 8 |
| Threshold value circuit (comparator) | 9 |
| Active element of pyro-electrical detector | 11 |
| Coating layer (Reflector, first electrode) | 12 |
| Second electrode | 13 |
| Housing | 14 |
| Not Used | 15, 16 |
| Contact | 17 |
| Field effect transistor (J1) 2N4117 | 18 |
| Gate resistance (RG) | 19 |
| Base plate (FIG. 6) | 21 |
| (Fire-alarm) housing (FIG. 7) | 22 |
| Air inlet opening (funnel) | 23 |
| Measuring chamber | 24 |
| Ridge (Rib in FIG. 7) | 25 |
| Funnel mouth | 26 |
| Funnel neck | 27 |
| (Holding) bar | 28 |
| Cover plate | 29 |
| Mounting plate | 30 |
| Wire | 31 |
| Intermediate plate | 32 |
| Sensor capacitance | CG |
| Frequency | f |
| Upper limit frequency (about 5 $H_z$) | fo |
| Lower limit frequency (about 0.1 $H_z$) | fu |
| Ludolf's number | P |
| Gate resistance value | RG |
| Time | t |
| Integration duration | T |
| Thermal time constant | Tth |
| Voltage at input of RMS-DC-Converter | u |
| Output signal of RMS-DC-Converter | Urms |

DETAILED DESCRIPTION OF THE PREFERRED EMBODIMENT

Figure 4:
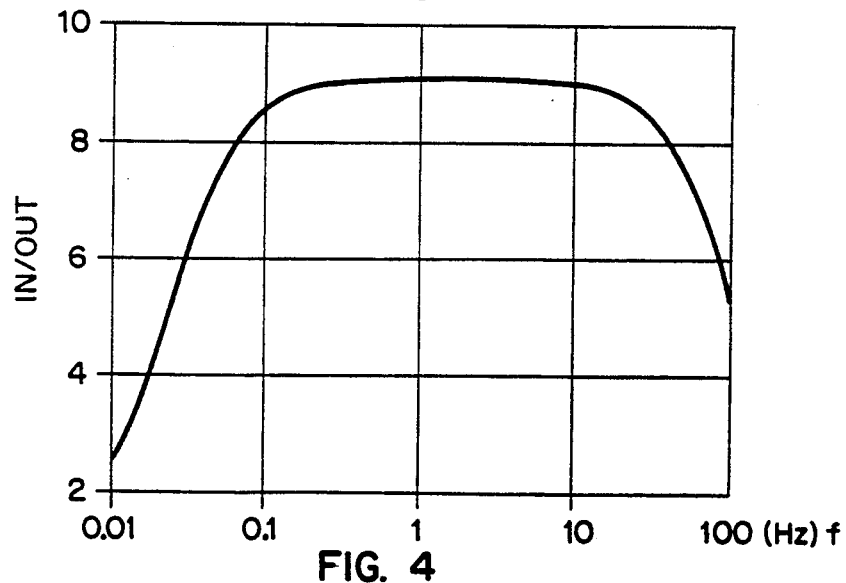
FIG. 4 shows the pass-band characteristic of a pass-band filter for a fire alarm according to the invention.

The block diagram of a fire alarm according to the invention is illustrated in FIG. 1. Temperature sensor 3 is a pyro-electrical detector, the design of which is explained in greater detail in connection with FIG. 2. The output signal of temperature sensor 3 is sent to an electrical pass-band filter 4, which has a pass-band characteristic as illustrated in FIG. 4. The signal is further conveyed to an RMS-DC Converter 5 and to an output circuit 6, which prepares the signals for transmission to a central control unit 2.

Figure 2:
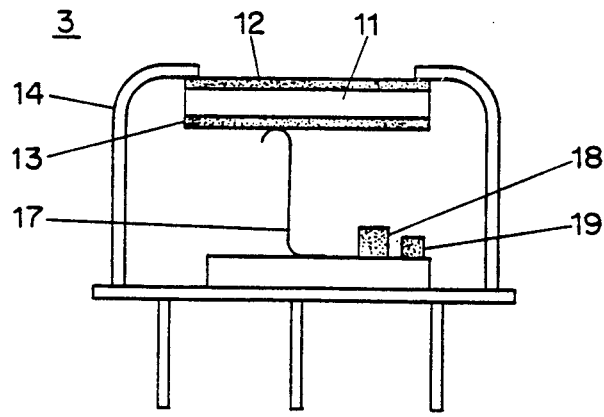
FIG. 2 shows the construction of a temperature sensor usable in a fire alarm according to the invention, in longitudinal section.

The temperature sensor 3 shown in longitudinal section in FIG. 2 is a pyro-electrical detector that is able to detect rapid changes in temperature. The active element 11 consists of a lithium tantalate monocrystal, $LiTaO_3$. Instead of lithium tantalate, other pyro-electrical materials, e.g. modified lead zirconate-lead titanate-ceramic; [$Pb(Zr,Ti)O_3$; PZT], Polyvinylidenfluoride (PVDF), or other similar materials can be used. A 50 nm-thick layer 12 of nickel is vacuum-metallized onto the outer surface of active element 11, which said layer of nickel forms part of the sensor housing 14 of sensor 3, and which simultaneously serves as electrode and as infrared-radiation reflector. Since the infrared-radiation occurring is reflected by layer 12, temperature sensor 3 is sensitive only to convection heat. The inner surface of active element 11 is covered with a second electrode 13, which is connected via a contact 17 with the gate connection of a field effect transistor 18. The relevant gate resistance 19, which lies parallel to temperature sensor 3, is chosen in such manner that the slowest still undetected temperature fluctuations have the frequency $$f = \frac{1}{2\,P\,RG\,CG}$$

with P being the Ludolf's number, RG [19] the resistance of the gate resistance of field effect transistor 18, and CG the capacitance of sensor 3.

Figure 3:
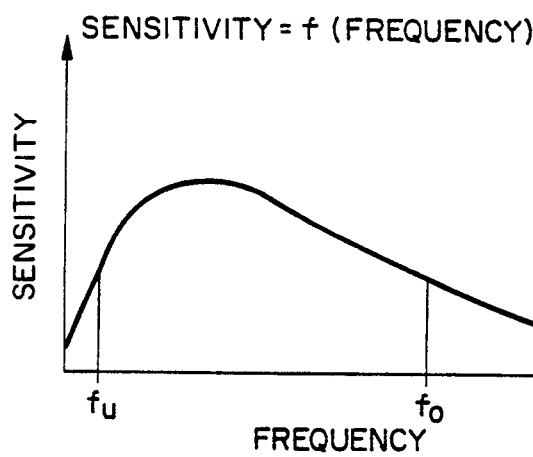
FIG. 3 shows a graphic illustration of the sensitivity of a temperature sensor dependent on frequency.

The thermal time constant Tth, which is supplied by the geometric design of sensor 3, determines the upper limit frequency fo for the temperature fluctuations which sensor 3 is able to begin detecting. The sensitivity of sensor 3 dependent upon frequency f of the temperature fluctuations is represented in graph form in FIG. 3. In FIG. 3, fu indicates the lower (approximately 0.1 $H_z$) and fo the upper limit frequency (approximately 5 $H_z$) at which the sensor gives out a signal that is usable.

As described above, the output signal of temperature sensor 3 is sent to an electrical pass-band filter 4. The pass-band characteristic of a pass-band filter 4 depending upon frequency f is illustrated in FIG. 4. The ratio of input to output voltage is entered on the axis of the ordinate, the frequency f is entered in Hertz on the axis of abscissa. The filter 4 is designed in such manner that frequencies below 0.1 Hz and above 20 Hz are no longer passed through.

The output of pass-band filter 4 is connected to a root-mean-square-to direct-voltage converter 5(RMS-DC-Converter), the output signal of which, Urms, depends on the applied voltage in the following manner:

$$Urms = \sqrt{\frac{1}{T} u^2(t)\cdot dt}\,,$$

in which T is the integration duration of the signal, u(t) the input voltage conducted to the RMS-DC-Converter, and t the time. The quantity T is experimentally chosen to reduce the false alarm rate and is typically in the order of 10 seconds. Converters of this type can be obtained industrially under the name "Analog Devices AD 637." The output signal Urms of the RMS-DC-Converter is then led to an output circuit 6, which readies the signals for transmission to center 2.

A further reduction in false alarms in fire alarm 1 can be achieved by transmitting the output signal of pass-band filter 4 not to an RMS-DC-Converter 5 but rather, after digitalization, to a microprocessor, not shown, where it is processed a special signal processing algorithm implementing an RMS-DC-Converter or other algorithm, so that only relevant fire-specific events of temperature fluctuation are processed.

Figure 5:
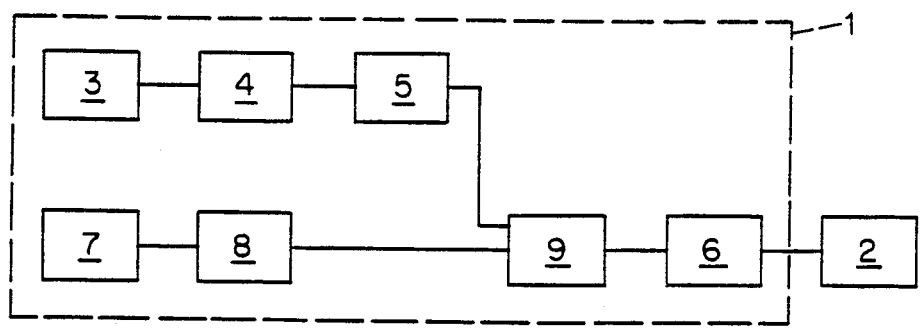
FIG. 5 shows the block diagram of an improved embodiment of a fire alarm according to the invention, in which a second fire criterion is processed.

Another improved embodiment of a fire alarm 1 according to the invention is illustrated in FIG. 5. Here, through simultaneous measurement of temperature fluctuation as well as other fire criteria, for example the detection of combustion products, which are carried up to the ceiling area along with the convection current, a fire alarm that is particularly insensitive to errors is shown. Temperature sensor 3, pass-band filter 4, and RMS-DC-Converter 5 correspond to FIG. 1. As a second fire discrimination criterion, the entrance of smoke into the fire alarm 1 is detected and processed. For this purpose a scattered-light smoke sensor 7 is arranged in the housing of the fire alarm 1, the output signal of which said scattered-light smoke sensor 7 is processed in a signal processing circuit 8. The output signals of processing circuit 8 of smoke sensor 7 and of the RMS-DC-Converter 5 are sent to a thresholding circuit 9. In normal cases, that is, when neither temperature sensor 3 nor smoke sensor 7 indicate the presence of fire-specific characteristic quantities, both processing channels use a preset, relatively high threshold value. When the processing channel for temperature fluctuation indicates the occurrence of a fire-specific temperature fluctuation, that is, when the RMS-DC-Converter 5 puts out an appropriately high output signal to threshold processing circuit 9, then the threshold value for the detection of smoke is lowered in the threshold processing circuit 9. An alarm signal is transmitted from threshold processing circuit 9 via output circuit 6 to central control unit 2 only if the output signal of smoke sensor 7 exceeds the smoke-density threshold value newly established for the smoke sensor processing channel.

Figure 6:
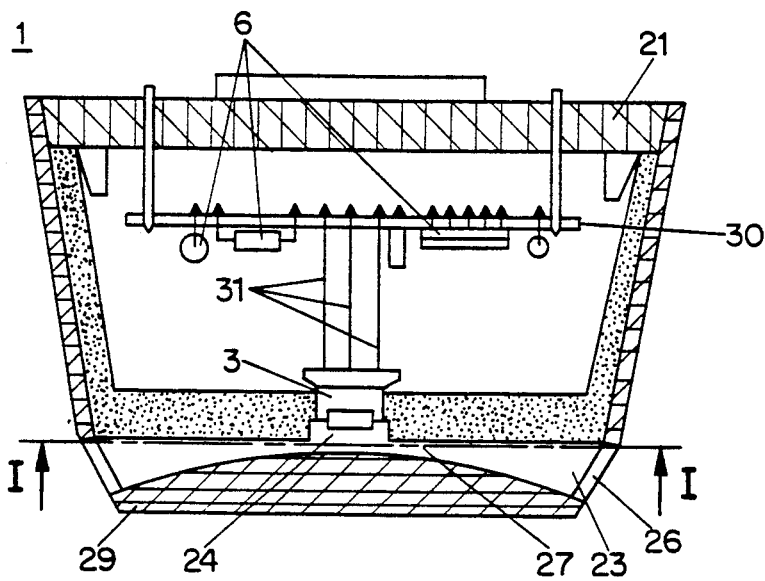
FIG. 6 shows, in longitudinal section, the design of a fire alarm according to the invention, with a temperature sensor.

In FIG. 6, a fire alarm 1 according to the invention, with a temperature sensor 3, is illustrated in longitudinal section. On a base plate 21, through which fire alarm 1 can be connected with a socket, not illustrated, a (fire alarm) housing 22 is positioned, the bottom portion of said housing 22 has an air inlet opening 23 that covers a large area, through which said air inlet opening 23 the ambient air can flow into the housing from all sides. Inside housing 22 there is a mounting plate 30, on which the individual circuit elements are mounted. In the bottom portion of housing 22 there is a measuring chamber 24, which is positioned in an intermediate plate 32. The temperature sensor 3 is positioned inside measuring chamber 24. Sensor 3 is connected to output circuit 6 via electrical wires 31.

Below measuring chamber 24 there is a cover plate 29, which protects temperature sensor 3 from the influence of direct heat radiation, and which together with intermediate plate 32 forms air inlet opening 23. Cover plate 29 is connected by means of a few holding ribs 28 with the wall of housing 22, so that the path of the inflowing air is narrowed down as little as possible. In the simplest case, the measuring chamber 24 consists of an opening located in the center of the intermediate plate 32. The cylindrical hole in the intermediate plate 32 forms the outer wall of measuring chamber 24, while the surface of temperature sensor 3 and cover plate 29 form the upper and lower connection of measuring chamber 24.

To lead the air, after it enters air inlet opening 23, as quickly as possible to measuring chamber 24, the air inlet opening 23 is funnel-shaped, that is, its lumen narrows continuously from funnel mouth 26 to funnel neck 27, so that the entering air is accelerated without the occurrence of turbulence. Through the enlargement of the lumen upon entry from funnel neck 27 to measuring chamber 24, an increase in pressure occurs in the entering air flow; simultaneously a swirling of the air is induced as the air enters through the edge at the funnel neck, whereby a good heat transfer of air to temperature sensor 3 can take place. Via this arrangement, the temperature fluctuations in the entering air are transferred undistorted to sensor 3.

Figure 7:
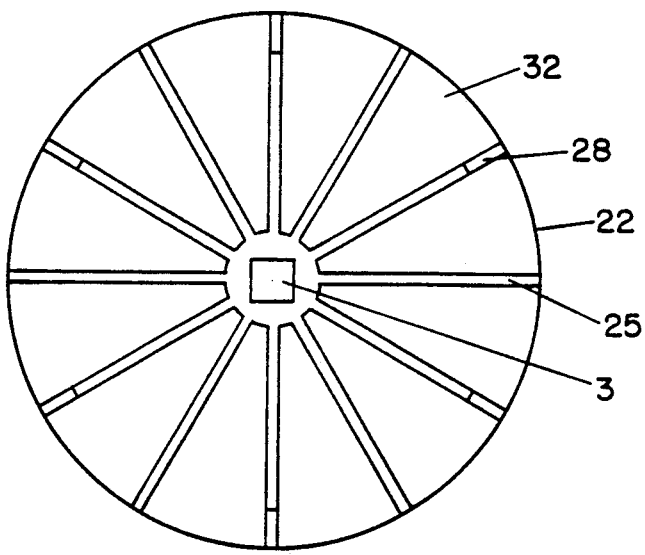
FIG. 7 shows a cross-section through the fire alarm according to FIG. 6 along line I—I.

In order to better lead the inflowing air to measuring chamber 24, according to a preferred embodiment of fire alarm 1, conduction surfaces or separating ribs are positioned radially in the air inlet opening 23. They can be positioned on the upper surface of cover plate 29 or on the lower surface of intermediate plate 32. In FIG. 7 a cross-section through a fire alarm according to FIG. 6 along section I—I is illustrated. In this case, the conduction surfaces are designed as ribs or ridges 25 on the lower surface of intermediate plate 32.

Figure 8:
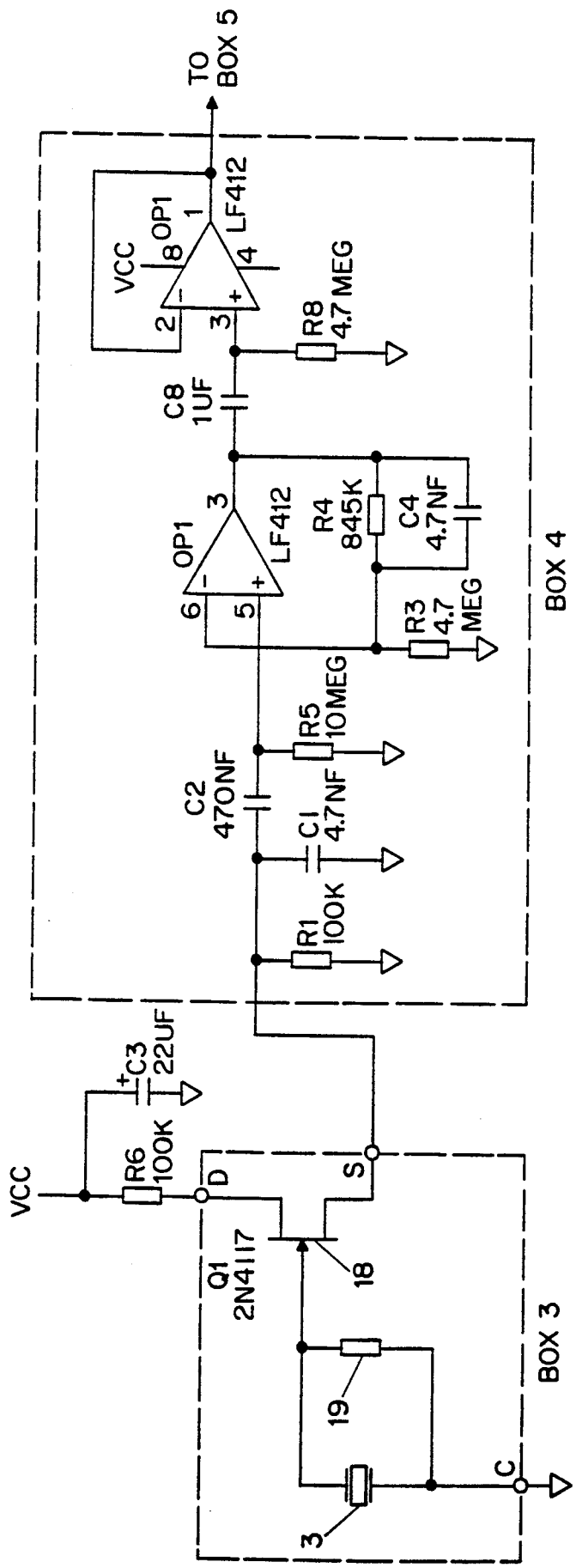
FIG. 8 shows the electrical equivalent circuit of boxes 3 and 4 referenced in FIG. 1.
Figure 9:
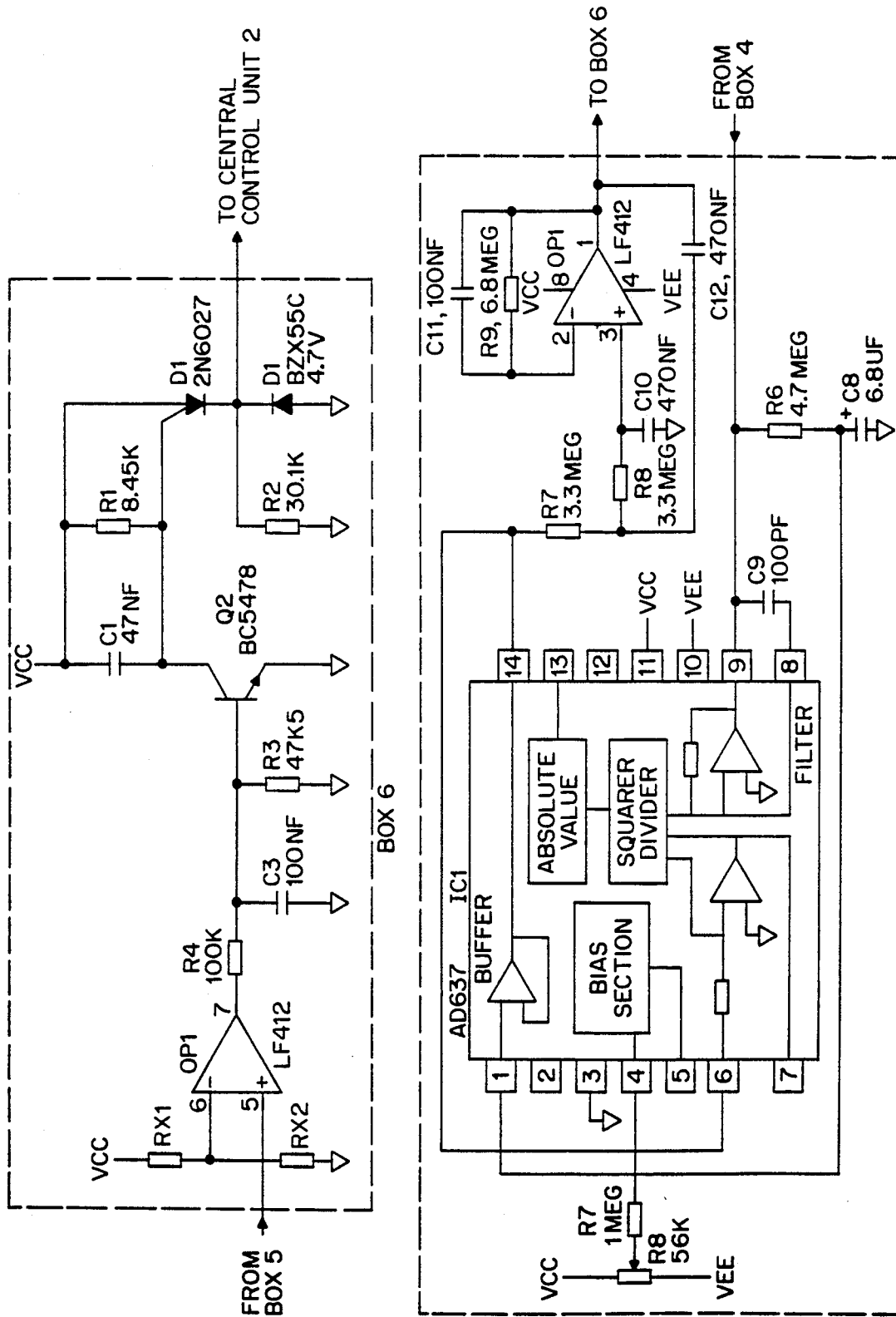
FIG. 9 has the electrical equivalent circuit of boxes 5 and 6 referenced in FIG. 1.

FIG. 8 has two parts: box 3 and box 4. These correspond to the blocks identified in FIG. 1 as 3 and 4. Box 3 shows the circuit diagram associated with the interface of the temperature sensor to the FET transistor, while box 4 gives an example of a possible implementation for a band pass filter utilizing two operational amplifiers to create the voltage transfer function shown in FIG. 4. FIG. 9 shows examples of a possible implementation of items 5, and 6 depicted in FIG. 5. Box 5 shows the commercially available RMS to DC converter applied to process signals from the band pass filter 4. Box 6 shows a threshold circuit formed by RX1 and RX2 working in conjunction with operational amplifier OP1 to provide an output to central control Unit 2.

Variants on the above-described circuits and physical structure for fire alarms are possible in the context of the invention according to the claims, and are well known to those skilled in the art.

We claim:

1. A fire alarm for the early detection of fires comprising:
    a first sensing means for sensing a first fire related phenomenon having a first electrical output, where said first sensing means is sensitive to temperature fluctuations having frequency components in the range of 0.1 to 20 Hz;
    a second sensing means for sensing a second fire related phenomenon, different from the first fire related phenomenon, having a second electrical output;
    a means for combining the first and second electrical output from the first and the second sensing means respectively for generating a third output;
    and a housing containing the first sensing means having means for optimizing the flow of air to the first sensing means.

2. A fire alarm as described in claim 1 where the second sensing means is a scattered light smoke detector.

3. A fire alarm as described in claim 1 where the means for combining the first and the second electrical output from the first and the second sensing means respectively produces an output representing a logical operation between the first and the second output.

4. A fire alarm as described in claim 3 where the logical operation is a logical AND operation.

5. A fire alarm as described in claim 3 where the means for combining the first and the second electrical output from the first and the second sensing means produces a third output only when the first and second outputs from the first and second sensing means simultaneously output an electrical signal.

6. A fire alarm as described in claim 1 where the means for combining the first and second electrical output compares individually the output from the first and the second sensing means to a threshold before generating the third output.

7. A fire alarm as described in claim 1 where the second sensing means reacts to a fire aerosol.

8. A fire alarm for the early detection of fires comprising:
    a first sensing means for sensing a first fire related phenomenon having a first electrical output;

a second sensing means for sensing a second fire related phenomenon, different from the first fire related phenomenon, having a second electrical output;

a means for combining the first and the second electrical output from the first and the second sensing means respectively for generating a third output;

a housing containing the first sensing means having means for optimizing the flow of air to the first sensing means; and a measuring chamber (24), where the first sensing means forms one wall of the measuring chamber (24) in the housing, the measuring chamber having a volume not larger than the sensing means.

9. Fire alarm as described in claim 8 where the measuring chamber (24) is proximal to means for increasing the turbulence of the air entering it, said turbulence increasing means being peripherally disposed near the chamber's (24) outer circumference.

10. Fire alarm as described in claim 9 where the means for increasing the turbulence of the air in chamber (24) are ridges (25) external to chamber (24) running radially from chamber (24) to an air inlet opening (23), said ridges (25) being an integral part of the lower surface of an intermediate plate (32).

11. Fire alarm as described in claim 9 where the means for increasing air turbulence are rods.

12. Fire alarm as described in claim 9 where the means for increasing air turbulence are bars.

13. Fire alarm as described in claim 8 where the measuring chamber (24) is centered on the cylindrical axis of the housing.

14. Fire alarm as described in claim 8 where an intermediate plate (32) holds the measuring chamber (24) and a cover plate (29) to protect measuring chamber (24) from the direct heat radiation and where said plates (32, 29) together form an air inlet opening (23) leading to the measuring chamber (24).

15. Fire alarm as described in claim 14, where the air inlet opening (23) forms a funnel to the exterior of the housing, said funnel narrowing down to the measuring chamber (24).

16. Fire alarm as described in claim 15 where the funnel has cylindrical symmetry and its longitudinal section corresponds to a Venturi tube.

17. Fire alarm as described in claim 15 where the funnel has a funnel mouth (26) and a funnel neck (27) smaller than the funnel mouth (26).

18. A fire alarm for the early detection of fires comprising:
a first sensing means for sensing a first fire related phenomenon having a first electrical output;
a second sensing means for sensing a second fire related phenomenon, different from the first fire related phenomenon, having a second electrical output;
a means for combining the first and the second electrical output from the first and the second sensing means respectively for generating a third output, where the means for combining the first and the second electrical output is a band pass filter;
and a housing containing the first sensing means having means for optimizing the flow of air to the first sensing means.

19. A fire alarm for the early detection of fires comprising:
a first sensing means for sensing a first fire related phenomenon having a first electrical output;
a second sensing means for sensing a second fire related phenomenon, different from the first fire related phenomenon, having a second electrical output;
a means for combining the first and the second electrical output from the first and the second sensing means respectively for generating a third output, where the means for combining the first and the second electrical output can be configured to analyze only the first electrical output for generating the third output;
and a housing containing the first sensing means having means for optimizing the flow of air to the first sensing means.

20. Method for early detection of fires comprising:
(a) sensing temperature variations as a first fire related phenomenon with a temperature sensing means having a first electrical output (3),
(b) sensing a second fire related phenomenon with a sensing means having a second electrical output (7),
(c) combining the first and second electrical output into a third output,
(d) providing a means for optimizing the flow of air to the temperature sensing means for the first fire related phenomenon.

21. Method as described in claim 20 where sensing the second fire related phenomenon is triggered by the presence of fire aerosols.

22. Method as described in claim 20 where the means for optimizing the flow of air to the temperature sensing means shields the temperature detector from direct heat radiation.

23. Method for early detection of fires comprising the detection of variations in the temperature of ambient air with a temperature sensing means, said temperature sensing means being able to detect temperature variations having frequency components in the range of 0.1 Hz to 20 Hz.

24. A fire alarm for the early detection of fires comprising a detector for temperature variations, said detector being able to detect temperature variations having frequency components in the range of 0.1 Hz to 20 Hz.

25. A fire alarm for the early detection of fires comprising:
a first sensing means for sensing a first fire related phenomenon having a first electrical output;
a second sensing means for sensing a second fire related phenomenon, different from the first fire related phenomenon, having a second electrical output;
a means for combining the first and the second electrical output from the first and the second sensing means respectively for generating a third output, where the means for combining the first and second electrical output compares individually the output from the first and the second sensing means to a threshold before generating the third output, and where exceeding the threshold for the first sensing means lowers the threshold for the second sensing means;
and a housing containing the first sensing means having means for optimizing the flow of air to the first sensing means.

* * * * *

UNITED STATES PATENT AND TRADEMARK OFFICE
CERTIFICATE OF CORRECTION

PATENT NO.  : 5,005,003
DATED       : April 2, 1991
INVENTOR(S) : Peter Ryser and Sigfrid Strassler It is certified that error appears in the above-identified patent and that said Letters Patent is hereby corrected as shown below:

Col. 2, line 60, delete "that".
Col. 6, line 52, "processed" should read --processed in--.

Signed and Sealed this

Twentieth Day of October, 1992

Attest:

DOUGLAS B. COMER

Attesting Officer      Acting Commissioner of Patents and Trademarks